United States Patent [19]
Borasio et al.

[11] Patent Number: 5,529,476
[45] Date of Patent: Jun. 25, 1996

[54] APPARATUS FOR MANUFACTURING AIR FILTERS FOR MOTOR VEHICLES

[75] Inventors: Franco Borasio, Desana; Paolo Baracchi, Turin, both of Italy

[73] Assignee: TECNOCAR s. r. l., Turin, Italy

[21] Appl. No.: 330,974

[22] Filed: Oct. 28, 1994

[30] Foreign Application Priority Data

Jun. 2, 1994 [IT] Italy .................. TO94A0455

[51] Int. Cl.6 ................................. B29C 45/14
[52] U.S. Cl. ................. 425/116; 425/125; 425/129.100; 425/DIG. 47; 264/275; 264/279; 264/46.400
[58] Field of Search ................. 425/116, 125, 425/129.1, DIG. 47, 127, 117; 264/328.8, 328.12, DIG. 48, 46.4, 275, 279; 249/91, 93

[56] References Cited

U.S. PATENT DOCUMENTS

| | | | |
|---|---|---|---|
| 3,613,223 | 10/1971 | Bush | 425/DIG. 47 |
| 4,347,208 | 8/1982 | Southall | 264/DIG. 48 |
| 4,746,339 | 5/1988 | Millard | 249/93 |
| 4,824,357 | 4/1989 | Christiansen | 425/DIG. 47 |
| 4,851,176 | 7/1989 | Christiansen et al. | 425/DIG. 47 |
| 5,308,559 | 5/1994 | Baracchi et al. | 264/46.4 |

FOREIGN PATENT DOCUMENTS 53-113371  10/1978  Japan ................. 264/DIG. 48

*Primary Examiner*—Khahn P. Nguyen
*Attorney, Agent, or Firm*—Paul & Paul

[57] ABSTRACT

An apparatus for manufacturing filters for motor vehicles essentially consists of a die (1, 2) in which the filtering element (9) is introduced, around which a channel (25) is formed where a movable frame (10) is lowered having a shape substantially corresponding to that of the filtering element (9), so as to define an injection cavity (27) separated from the filtering element, and an expansion cavity (28) adjacent the filtering element (9) that are communicate one another by the lifting of the movable frame (10), whereby the resin can expand and stick to the filtering element (9). The die is provided with a seal groove (3) acting as a seal gasket and is filled with synthetic resin during the expansion thereof, which resin prevents any further resin from entering the space between the die (2) and the movable frame (10).

6 Claims, 3 Drawing Sheets

APPARATUS FOR MANUFACTURING AIR FILTERS FOR MOTOR VEHICLES

BACKGROUND OF THE INVENTION

The present invention refers to an improved apparatus for manufacturing air filters for motor vehicles, such as air filters for the engine or the passenger compartment of a motor vehicle.

An air filter for automotive use is usually composed of a filtering element made of pleated paper, shaped as a parallelepiped or a cylinder, to which a peripheral rim or border is sticked, made of foamed resin, usually polyurethane (PU) or polyvinylchloride (PVC). The foamed resin is generally in the form of a flexible foam member that fixes shape and dimensions of the filtering element, at the same time acting as a seal gasket when the filter is assembled in its housing, on board of the vehicle.

The foamed resin rim is usually obtained by placing into a die the properly pleated paper, and then injecting or casting the resin into a die cavity or recess extending all around the paper. The plastic melted resin sticks to the paper forming a border or rim that copies the die cavity shape.

EP-A-0 486 846 according to which the preamble of claim 1 has been drafted discloses an apparatus for manufacturing an air filter for motor vehicles which solves the problems deriving from a possible not uniform distribution of the resin along the die cavity, and an excessive penetration of the resin into the filtering paper, by providing a channel defined in the lower die and cooperating with a movable frame for realizing a resin injection cavity and a resin expansion cavity.

However the apparatus disclosed by this patent has the drawback according to which the gasket 3 provided between the upper and the lower dies may not be capable of forming a sufficient seal to the expanding resin which therefore could enter the space or gap between the upper die 2 and the movable frame 10, thus hindering the slide movement of the movable frame 10 and in case blocking the whole apparatus.

Therefore the object of the present invention is to solve such sealing problem of the known apparatus in respect of resin leaks to regions where it has not to enter: this object is achieved through an improved construction of the apparatus upper die that allows for using the resin itself as a sealing gasket.

SUMMARY OF THE INVENTION

The above and other objects and advantages of the invention, such as the ones resulting from the following description are accomplished through an an apparatus for manufacturing an air filter for motor vehicles, comprising: a die composed of a lower die provided with a channel defined around the bearing plane thereof, and an upper die provided on its peripheral portion contacting said frame with a sealing groove or recess, said lower and upper dies being rotatingly constrained one another, in which die a peripheral rim is formed by injecting a melted synthetic resin around a paper filtering element placed inside said die, a frame with parallel walls that are contiguous to the sides of the paper filtering element contained in said die and movable from a contact position against the bottom of said channel for allowing the injection of said resin, to a lifted position for allowing the subsequent expansion of the injected resin to said paper filtering element and stick to it, whereby said sealing groove or recess is filled by said synthetic resin during the expansion thereof for preventing the further flowing of resin between the said frame and upper die.

BRIEF DESCRIPTION OF THE DRAWINGS

A preferred embodiment of the invention will now be described, given as an illustrating and not limiting example, with reference to the accompanying drawings, in which.

DETAILED DESCRIPTION OF A PREFERRED EMBODIMENT

Figure 1:
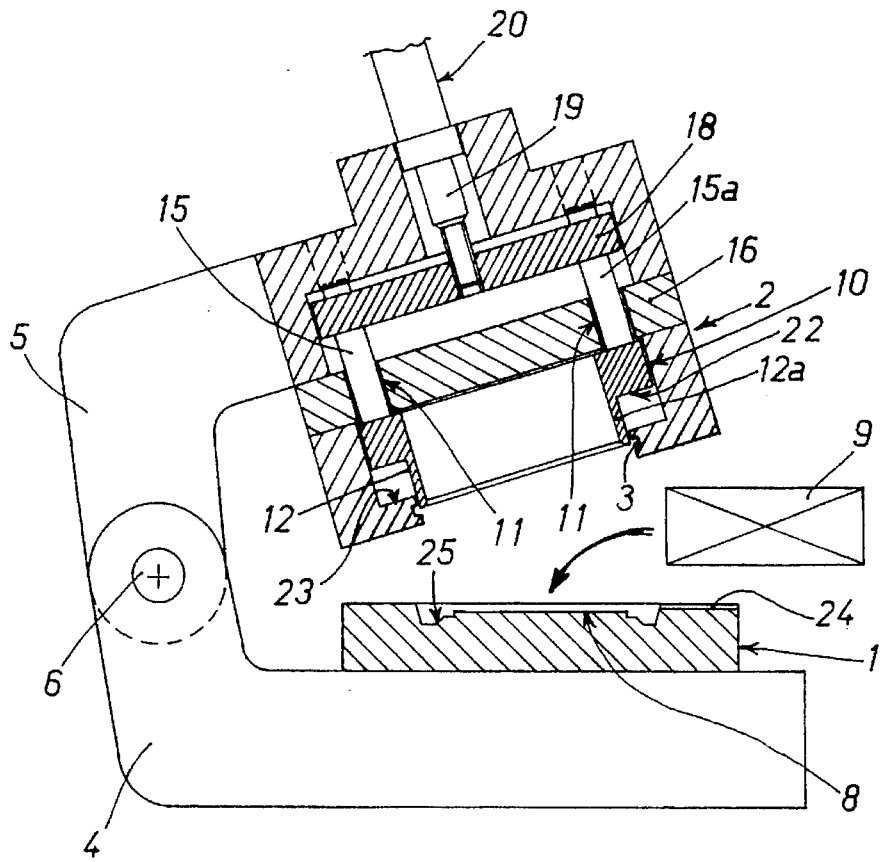
FIG. 1 is a partially cross-sectioned view of the apparatus according to the invention with the die open.

With reference to FIG. 1, the apparatus according to the invention includes a die composed of a lower die 1 and an upper die 2.

Figure 2:
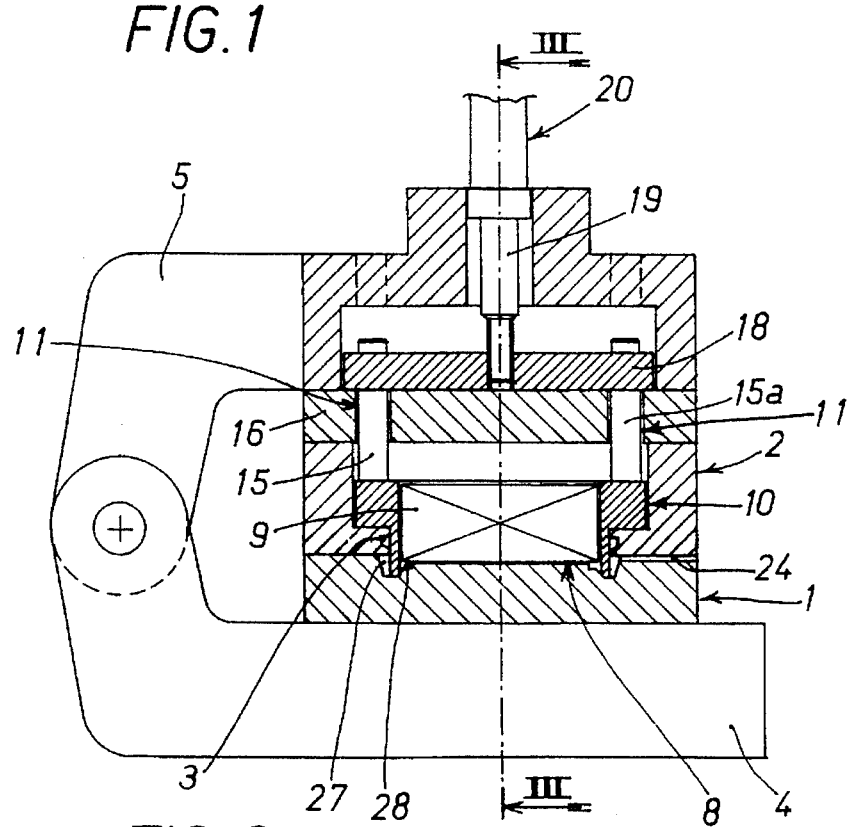
FIG. 2 is a partially cross-sectioned view of the apparatus in FIG. 1, with the die closed, in the injection position.

As shown in FIG. 1, the two dies 1 and 2 are rotatingly constrained swingably movable toward (closed position) and away from (open position) one another through their respective arms 4 and 5 with fulcrum on a pin 6. FIG. 1 shows the die open, while FIG. 2 shows the closed die. The central plane 8 of the lower die 1 is formed with a shape and a size adapted for receiving a paper filtering element 9, separately manufactured in a known manner. In case of air filters for vehicle engines, the filtering element has a a cylindical or parallelepiped shape. In the illustrated embodiment, the filtering element 9 has a parallelepiped shape.

Inside the upper die 2 a structure is contained, essentially composed of a quadrangular frame 10, whose hollow interior has shape and dimensions corresponding to those of the filtering element 9, and is therefore such as to surround and keep the filtering element in position on the plane 8 during working, as will be explained later on.

Figure 2A:
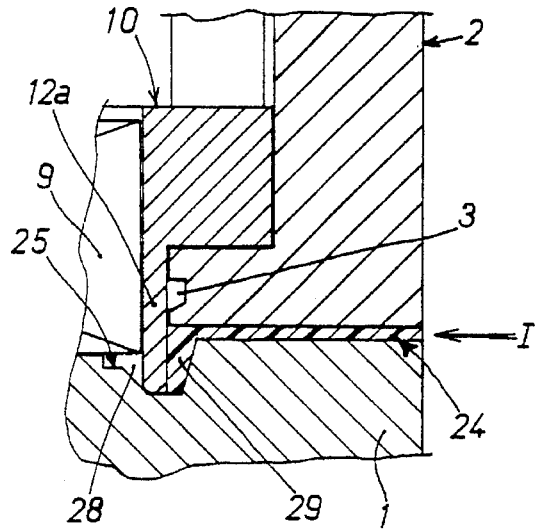
FIG. 2a is an enlarged cross-sectioned view of a portion of FIG. 2, during the resin injection.
Figure 2B:
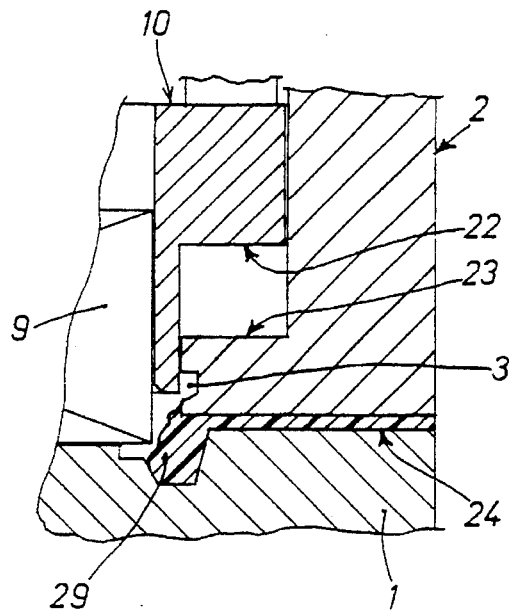
FIG. 2b is a view corresponding to that of FIG. 2a, during the resin expansion.
Figure 3:
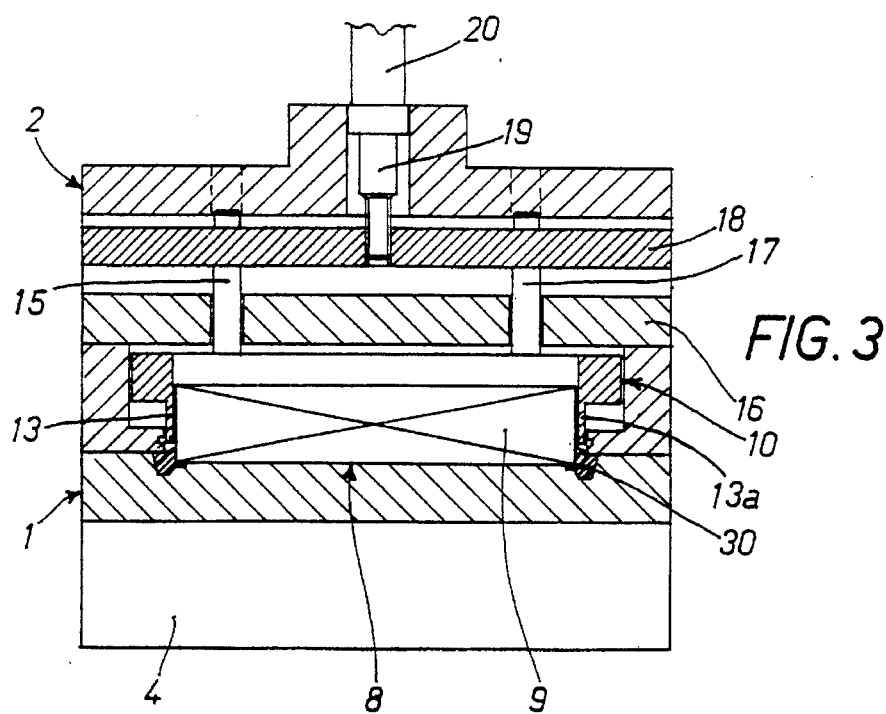
FIG. 3 is a cross-sectioned view along line III—III in FIG. 2, in another operative position.

With reference also to FIGS. 2 and 3, the frame 10 consists of four orthogonal walls 12, 12a, 13, 13a, rigidly connected one another, and connected at the upper side to four columns 15, 15a,17,17a (this latter being not shown in the Figure), that can slide in holes 11 provided in a guide plate 16 of the upper die, and are then secured to a driving plate 18, parallel to the guide plate 16. The driving plate 18 is in turn connected to the piston 19 of an actuator cylinder 20, only partially shown. In the retracted position of the piston, shown in FIGS. 1, 2b, 3, 3a, the frame 10 is lifted from the lower die 1, but, when the die is closed it surrounds the filtering element 9 and keeps it centered on the bearing plane 8 of the lower die 1. In the extended position of the piston 19, shown in FIG. 2, the frame 10 abuts against the die 1, and in this position the plate 18 is abutting against the guide plate 16.

The piston 19 stroke is such as to accomplish these movements of the frame 10, for the abutment against the die 1 and the detachment therefrom. To this aim, the frame 10 is formed with a continuous shoulder 22 suitable to abut against the stop surface 23 of the upper die 2.

Around the bearing plane 8 of the lower die 1, a channel 25 is defined whose cross-section profile defines the cross-section of the rim or border 30 of flexible foam of foamed resin to be molded around the filtering element 9. When the die is closed, the frame 10 abuts just inside such channel, thus defining, in the radially external part of channel 25, an injection cavity 27, which is separated from and not in communication with the filtering element 9, and in the radially internal part of the channel 25 an expansion cavity 28, internally delimited by the filtering element 9 (FIG. 2). This latter cavity preferably extends till below a part of the filtering element, in order to allow a better anchoring of the resin. This is shown in detail in FIG. 2a.

The outer cavity 27, communicates with an injection channel 24, through which the melted resin is injected into the die.

In accordance to the invention, a gasket is no longer provided between the die portions and the upper die 2 is formed with a seal groove or recess 3 formed along the periphery of the lower side thereof.

More particularly the upper die 2 is provided on its peripheral portion contacting the movable frame 10 with a sealing groove or recess 3 to be filled by said synthetic resin during the expansion thereof for preventing the further flowing of resin between the frame and upper die.

The operation of the above described apparatus is the following one. With the die open (FIG. 1), a previously prepared filtering element 9 is positioned over plane 8 of the lower die. Then, the die is closed and the frame 10 is lowered against the lower die 1. The walls 12, 12a, 13, 13a are positioned in a radially intermediate position within the channel 25, thus defining the injection cavity 27 and the expansion cavity 28 (FIG. 2). The melted resin 29 is injected into the cavity 27, as indicated by arrow I in FIG. 2a. The resin 29 is regularly and homogeneously distributed along the whole cavity and completely fills this latter. After a time depending on the properties of the employed resin, on the cavity geometry and on other operating factors, the frame 10 is lifted and the resin is allowed to expand through the expansion cavity 28 which now communicates with the cavity 27, till the resin reaches the filtering element 9, to which the resin adheres and sticks.

The expansion of the resin 29 towards the filtering element 9 is better shown in the detail of FIG. 2b. The resin 29, while expanding, enters the sealing groove 3 and fills it completely; thereafter it is this resin that behaves like a sealing gasket preventing any further resin from entering the space between the upper die 2 and the movable frame 10, thus preventing any block of the apparatus.

It is evident that the resin sticking to the filter paper only occurs under the force caused by the resin expansion, and not under the much stronger force generated by the injection pressure, as it happens in the known art. Therefore, a deep penetration of the melted resin into the paper filtering element is prevented, that would cause an excessive impregnation thereof and a consequent reduction of the filtering surface and capacity.

Figure 3A:
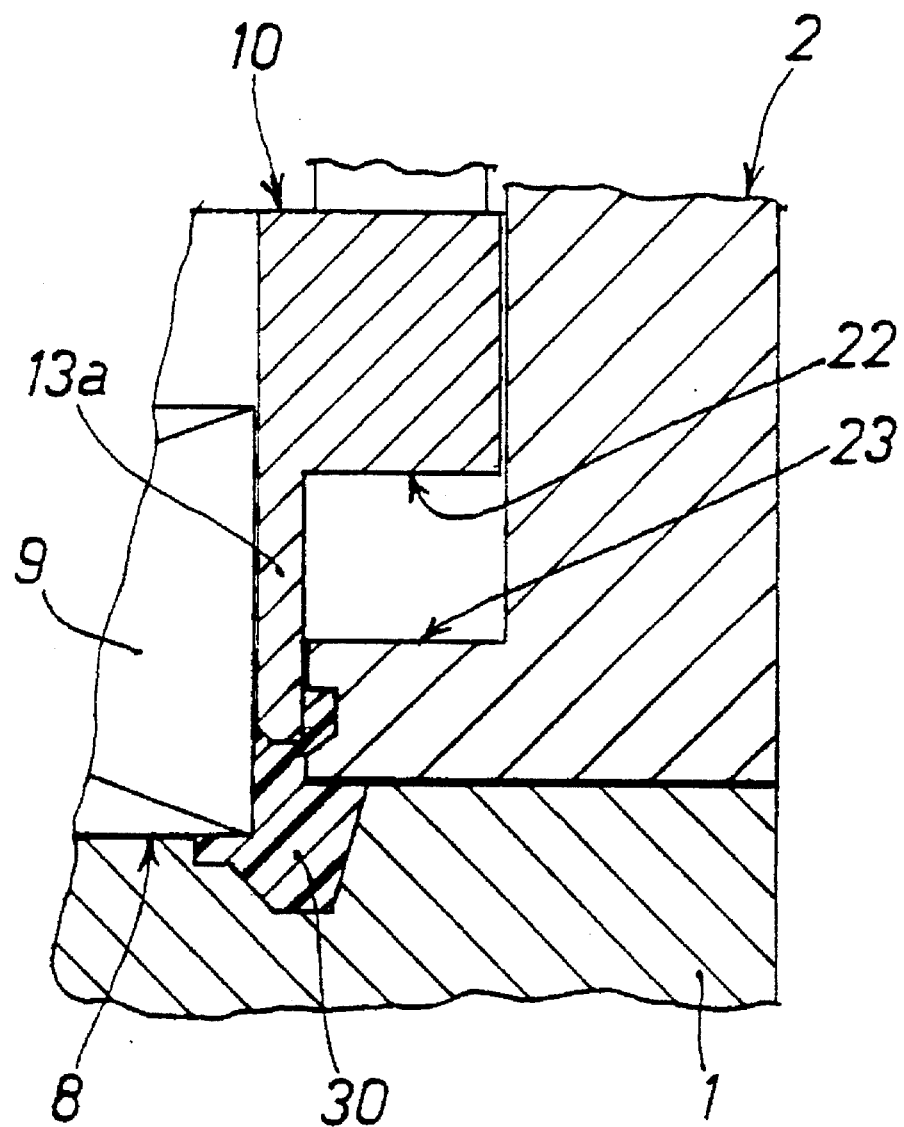
FIG. 3a is an enlarged cross-sectioned view of a portion of FIG. 3.

Once the expansion is terminated and the resin has been cooled, the filter is obtained complete with a border 30 of flexible foam of foamed resin, as shown in FIG. 3 and in the detail of FIG. 3a. Then the die is opened, the filter is removed, another paper filtering element is placed into the die and the above cycle is repeated.

Although a preferred embodiment of the invention has been disclosed, several modifications and changes can be made to the same within the scope of the inventive idea. For example the apparatus of the invention can be connected to a plurality of similar apparatuses, in a sort of "carrousel" for mass production of air filters, by employing a machine quite similar to the one disclosed in the above mentioned EP-A-0 486 846.

We claim:

1. An apparatus for manufacturing an air filter for motor vehicles, comprising:
    a) a die having a lower die and an upper die, wherein said upper and lower dies are swingably movable in relation to one another between open and closed positions, said lower die having a planar center portion for receiving a paper filtering element thereon and a main channel disposed around the planar center portion thereof;
    b) a frame having parallel walls defining a space therebetween, said frame being carried within said upper die and being movable from a contact position against the bottom of said main channel, wherein said frame divides said main channel to define an outer channel portion and an internal channel portion, to a raised position relative to said main channel;
    c) said internal channel portion comprising an expansion channel in communication with and defined in part by said paper filtering element;
    d) an injection channel through which melted resin is injected into the die, said injection channel being provided in communication with said outer channel portion;
    e) wherein said upper die has a peripheral groove provided in the lower portion thereof, said groove being in communication with said main channel when said frame is in its raised position, such that upon raising said frame melted resin within said main channel expands and fills said groove to form a gasket;
    f) wherein said gasket occupies said groove and prevents further flow of melted resin between said frame and the upper die in which said frame is carried.

2. An apparatus according to claim 1, wherein said expansion channel extends up to said filtering element.

3. An apparatus according to claim 1 wherein said filtering element comprises a parallelpiped shape including four sides, and wherein said moveable frame has a quadrangular shape with walls that are parallel to the sides of said filtering element.

4. An apparatus according to claim 1, wherein in said contact position against the bottom of said main channel the walls of said movable frame abut against the bottom of said main channel at a substantially radially intermediate position of said main channel.

5. An apparatus according to claim 3, wherein said upper die further comprises a guide plate having holes therein, a driving plate having holes therein, an actuator connected to said driving plate, and columns being slidably mounted in said guide plate holes, said columns connecting said movable frame with said driving plate through said guide plate for vertical movement of said movable frame by said actuator.

6. An apparatus according to claim 5, wherein said actuator comprises a piston.

* * * * *